Sept. 25, 1923.

J. SIMPSON ET AL

FRUIT PRESS

Filed Nov. 14, 1921

1,469,114

Inventors.
James Simpson
Robert Pettigrew McClure
Per:-
Attorneys.

Patented Sept. 25, 1923.

1,469,114

UNITED STATES PATENT OFFICE.

JAMES SIMPSON, OF GLASGOW, AND ROBERT PETTIGREW McCLURE, OF ARDROSSAN, SCOTLAND.

FRUIT PRESS.

Application filed November 14, 1921. Serial No. 515,004.

*To all whom it may concern:*

Be it known that we, JAMES SIMPSON and ROBERT PETTIGREW McCLURE, subjects of the King of Great Britain and Ireland, residing at 40 West End, Park Street, Glasgow, Scotland, and 60 Princes Street, Ardrossan, Ayrshire, Scotland, respectively, have invented certain new and useful Improvements in Fruit Presses, of which the following is a specification.

Our invention relates to an improved construction of press and strainer for household use, for the purpose of extracting juice from fruit and the like, for the making of jelly and other purposes.

According to this invention, we employ a cylindrical outer casing in which is supported an inner container for the reception of the fruit to be pressed. A screw-press is mounted in the upper end of the container, and is adapted to be screwed down upon the fruit so as to expel the juice therefrom, which escapes through a series of perforations in the side of the inner container.

Beneath the inner container and supported by the outer casing is a flannel or other strainer upon which the fruit juice drops, and through which it subsequently filters into the bottom of the outer casing, from which it may be drawn off through a suitable cock mounted in the side of this casing near its base.

In order that my invention may be more readily understood, reference is made to the accompanying sheet of illustrative drawings, in which:—

Figure 1:
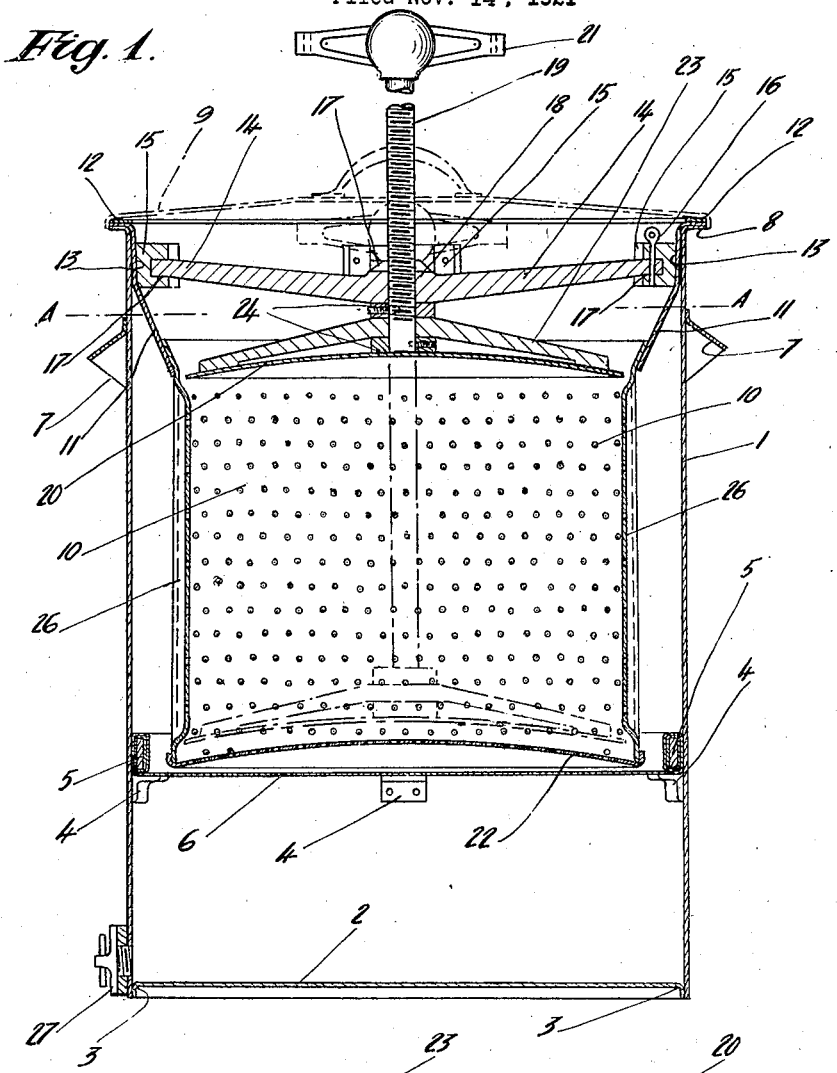
Figure 2:
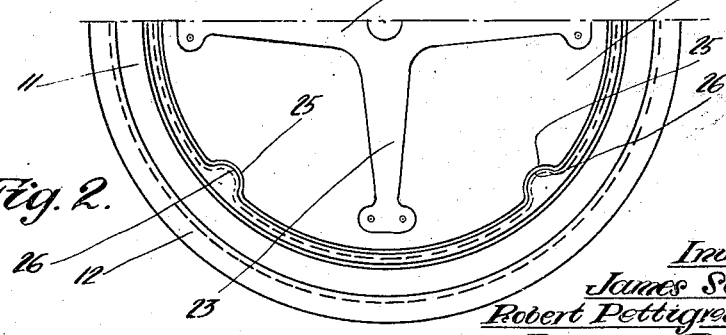

Figure 1 is a sectional elevation of a press and strainer for extracting juice from fruit and the like, constructed according to our invention, and Figure 2 is a half sectional plan on the line A A of Figure 1.

Referring to the drawings, the outer cylindrical case 1 is formed of black sheet iron, aluminium or other suitable material, and is closed at its lower end by means of the flanged base plate 2, which is riveted or otherwise secured round its outer edge 3 to the cylindrical casing 1. At a short distance above this base 2 are provided a series of pressed steel, cast iron, or aluminium angle lugs 4 riveted or otherwise secured round the interior of the casing 1, and arranged at the same height so as to form supports for a flannel strainer which rests upon them.

The flannel strainer comprises a ring 5 of wood or other suitable material, such as elm, over which is stretched a piece of flannel 6 the edges being wrapped round the wooden ring 5 and secured by sewing with linen thread.

This strainer rests upon the lugs 4 and may be readily removed for cleaning when the apparatus is dismantled. Suitable handles 7 of pressed steel or other suitable material are secured to the exterior of the casing 1, near its upper end, and the casing 1 is provided with an outwardly turned flange 8 at its top to support an inner container and to receive a cover or lid 9, shown in Figure 1 in dotted lines, and adapted to be placed in position when the apparatus is not in use. The inner container comprises a smaller cylindrical vessel 10 having perforated sides and supported within the outer casing 1, by means of a conical ring 11 secured to its upper end and provided with a flange 12 which rests upon the flange 8 at the top of the casing 1, and the lower end of the conical ring 11 may be attached to the inner container by riveting or other suitable means.

Above the inner container 10 and within the cylindrical portion 13 of the conical ring 11 is mounted a screw-press. This screw-press is supported by a spider 14 having a number of radial arms whose outer ends engage in lugs 15 secured within the cylindrical portion 13 of the conical ring 11 and adapted to be held in position by means of split pins 16 passed through these lugs 15 and the ends of the arms of the spider 14. These lugs 15 are slotted at 17 for the reception of the arms of the spider 14 and one end of these slots 17 is closed so as to form a stop for the arms of the spider when in the correct position, for the reception of the locking pins 16. When it is desired to remove the press all that is necessary is to extract the locking pins 16 and rotate the spider 14 to disengage the ends of its arms from the lugs 15, when the whole press may be lifted out.

The spider 14 is provided with a screw threaded boss 18 at its centre, in which engages the screw-threaded shaft 19 carrying at its lower end a press plate 20 and at its upper end a handle 21 by means of which the screw 19 may be rotated, so as to lower or raise the press plate 20.

The press plate 20 is preferably of sheet material slightly domed or concave on its under surface, to correspond with the perforated base 22 of the inner container 10. The press plate 20 is mounted upon a spider 23 loosely pivoted at its centre upon the lower end of the screw-threaded shaft 19 and located between a pair of collars 24 secured thereon, so that the screw-threaded shaft 19 may rotate freely in the spider 23.

In the outer edge of the press plate 20, are formed recesses 25, substantially semi-circular in shape, and adapted to engage with inwardly pressed vertical ribs 26, in the sides of the inner container 10. These recesses 25 and ribs 26 act to prevent the press plate 20 from rotating in the inner container 10 so that it is only free to move in an up or down direction, under the action of the screw 19.

The metal parts of the container may be conveniently enamelled inside and out in order to prevent rusting or where practicable they may be made from aluminium or other suitable non-rusting material.

In using the press and strainer the inner container is filled with fruit, and the press mounted in position as described. The handle 21 is then rotated, so as to screw the shaft 19 and with it the press plate 20 in a downward direction. The fruit in the inner container 10 will thus be compressed between the press plate 20 and the perforated base 22.

The juice from the crushed fruit passes out through the perforations in the sides and base of the container, and will fall on to the flannel strainer on the ring 5 which is supported beneath the inner container 10 and upon the lugs 4. The juice will gradually filter through this strainer into the space between it, and the base 2 of the container 1, in which it will collect and may be drawn off through suitable plug or tap 27 provided for this purpose.

When the operation is completed the inner container and the press may be removed from the outer casing, and the parts dismounted and cleaned. They may then be replaced in position, and when the press plate 20 is screwed down to its lowest position, as shown by the dotted lines in Figure 1 the cover 9 may be placed over the top of the outer casing 1, and will be kept clean and ready for subsequent use.

If desired many of the parts may be made of wood or other suitable material for instance the spider carrying the press plate may be made of wood, with a suitable boss for securing it to the press screw shaft.

We claim:—

1. A fruit press comprising an outer casing, supports on the inner surface of said casing, a strainer resting detachably on said supports, a perforated inner container, a flange on said container, said container being supported within the casing by said flange which engages the edge of the casing, lugs in the upper part of the casing, a spider detachably engaging in said lugs, a screw passing through said spider, a plate on said screw beneath the spider and adapted to pass down into said container, said spider and said screw in its lowest position being disposed wholly within said casing, and a lid for the casing for enclosing the whole apparatus.

2. A fruit press comprising an outer casing lugs in the upper part of the casing, a perforated inner container, a conical ring on said container, a flange on said ring, said container being supported within the casing by said flange which engages the edge of the casing, lugs in the upper part of said ring and projecting inwardly, a spider detachably engaging in said lugs, a screw passing through said spider, a plate on said screw beneath the spider and adapted to pass down into said container, and a handle for operating said screw, said spider and said screw in its lowest position being disposed wholly within said casing.

JAMES SIMPSON.
ROBERT PETTIGREW McCLURE.